(12) United States Patent
Ito

(10) Patent No.: US 8,995,762 B2
(45) Date of Patent: *Mar. 31, 2015

(54) IMAGE PROCESSING APPARATUS AND NON-TRANSITORY COMPUTER READABLE MEDIUM FOR OBTAINING SIMILARITY BETWEEN A LOCAL COLOR DISPLACEMENT DISTRIBUTION AND AN EXTRACTED COLOR DISPLACEMENT

(71) Applicant: Fuji Xerox Co., Ltd., Mianto-ku, Tokyo (JP)

(72) Inventor: Atsushi Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 135 days.

This patent is subject to a terminal disclaimer.

(21) Appl. No.: 13/765,437

(22) Filed: Feb. 12, 2013

(65) Prior Publication Data

US 2014/0044351 A1 Feb. 13, 2014

(30) Foreign Application Priority Data

Aug. 8, 2012 (JP) ................................. 2012-176289

(51) Int. Cl.
*G06K 9/00* (2006.01)
*G06K 9/34* (2006.01)
*G06K 9/46* (2006.01)
*G06T 1/00* (2006.01)

(52) U.S. Cl.
CPC ............... *G06K 9/4652* (2013.01); *G06K 9/46* (2013.01); *G06T 1/0028* (2013.01); *G06T 2201/0051* (2013.01)
USPC .......................................... 382/165; 382/164

(58) Field of Classification Search
None
See application file for complete search history.

(56) References Cited

U.S. PATENT DOCUMENTS

| | | | |
|---|---|---|---|
| 8,027,513 B2 * | 9/2011 | Leichter et al. ............... | 382/103 |
| 2004/0086153 A1 * | 5/2004 | Tsai et al. ..................... | 382/104 |
| 2006/0159370 A1 * | 7/2006 | Tanaka et al. ................. | 382/305 |
| 2014/0044350 A1 * | 2/2014 | Ito ................................. | 382/164 |

FOREIGN PATENT DOCUMENTS

| | | |
|---|---|---|
| JP | 10-145623 A | 5/1998 |
| JP | 10-243221 A | 9/1998 |

* cited by examiner

*Primary Examiner* — Aaron W Carter
*Assistant Examiner* — Feng Niu
(74) *Attorney, Agent, or Firm* — Sughrue Mion, PLLC

(57) ABSTRACT

An image processing apparatus includes a color displacement calculation unit, a distribution obtaining unit, and a similarity calculation unit. The color displacement calculation unit calculates local color displacements that are color displacements locally occurring in individual regions of interest of a given image. The distribution obtaining unit obtains distribution of the local color displacements with respect to an extracted-color displacement that is a displacement of a color preset in a reference region set for the regions of interest. The similarity calculation unit calculates similarity to the extracted-color displacement for the regions of interest using the distribution.

19 Claims, 13 Drawing Sheets a b c d a b

SET OF END POINTS OF
VECTORS OF LOCAL
COLOR DISPLACEMENTS

SPREADING $V_y$

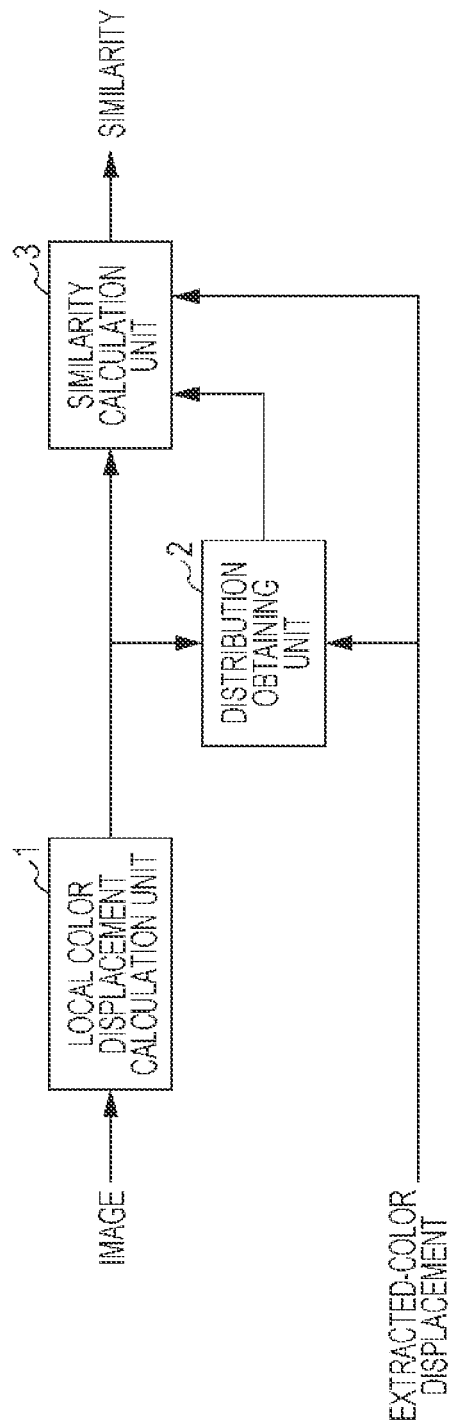

IMAGE PROCESSING APPARATUS AND NON-TRANSITORY COMPUTER READABLE MEDIUM FOR OBTAINING SIMILARITY BETWEEN A LOCAL COLOR DISPLACEMENT DISTRIBUTION AND AN EXTRACTED COLOR DISPLACEMENT

CROSS-REFERENCE TO RELATED APPLICATIONS

This application is based on and claims priority under 35 USC 119 from Japanese Patent Application No. 2012-176289 filed Aug. 8, 2012.

BACKGROUND (i) Technical Field

The present invention relates to an image processing apparatus and a non-transitory computer readable medium.

(ii) Related Art

In recent years, technologies for outputting an image having electronic information added thereto in a manner unrecognizable to the human eye and detecting the presence of the added information or extracting the added information when reading the image by using a reader have been developed and utilized.

SUMMARY

According to an aspect of the invention, there is provided an image processing apparatus including a color displacement calculation unit, a distribution obtaining unit, and a similarity calculation unit. The color displacement calculation unit calculates local color displacements that are color displacements locally occurring in individual regions of interest of a given image. The distribution obtaining unit obtains a distribution of the local color displacements with respect to an extracted-color displacement that is a displacement of a color preset in a reference region set for the regions of interest. The similarity calculation unit calculates similarity to the extracted-color displacement for the regions of interest using the distribution.

BRIEF DESCRIPTION OF THE DRAWINGS

Exemplary embodiments of the present invention will be described in detail based on the following figures, wherein:

FIG. 6 is a configuration diagram illustrating a first exemplary modification of the first exemplary embodiment of the present invention;

DETAILED DESCRIPTION

Figure 2A:
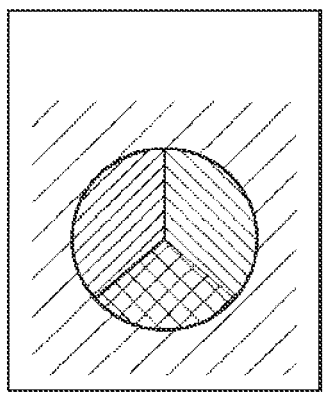
FIGS. 2A to 2C illustrate an example of the embedding of information.
Figure 2B:
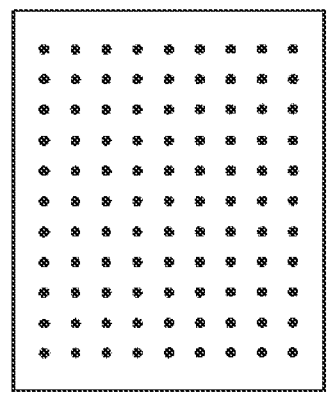
Figure 2C:
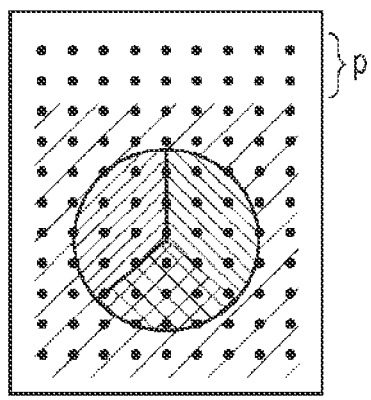
Figure 3:
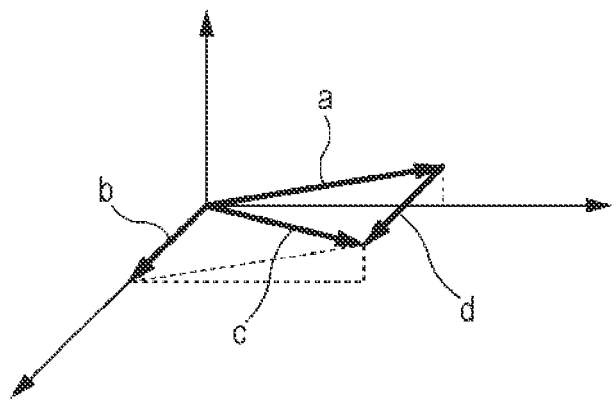
FIG. 3 illustrates a change in color when information is embedded.

First, an image having information embedded therein, which is used in exemplary embodiments of the present invention, will be described. FIGS. 2A to 2C illustrate an example of the embedding of information, and FIG. 3 illustrates a change in color when information is embedded. FIG. 2A illustrates an example of an original image, and FIG. 2B illustrates an example of an image of information to be embedded. In the example of the original image illustrated in FIG. 2A, different colors are represented by different hatching patterns. The original image is not limited to any particular image. Further, information may be embedded into the original image by embedding dots of a predetermined color. In the image of the information to be embedded illustrated in FIG. 2B, dots of a predetermined color are represented as black dots. The pattern to be used for embedding is not limited to a dot pattern, and the size, shape, and location of the pattern may be determined in advance and are not limited to those in the illustrated example. The pattern with which information is embedded, including the color thereof, may be set so as to be unrecognizable to most people at their first glance.

Information may be embedded into the original image by combining the information and the original image. For example, the image of the information illustrated in FIG. 2B may be combined with the image illustrated in FIG. 2A to obtain an image illustrated in FIG. 2C. The image illustrated in FIG. 2C is output. Thus, an image having information embedded therein is output.

FIG. 3 illustrates a specific example of a change in the color of a pixel in which information is embedded. A color a is the color of the corresponding pixel in the original image, and a color b is a color to be embedded. The color a of the pixel is changed to a color c by embedding information into the original image. Such a pixel whose color has been changed may be included in a combined image. Setting the color, size, and the like to be embedded so that they are not visually recognizable in the manner described above allows the visible color of the original image to be retained unchanged.

The color displacement in the pixel will now be focused on. The color a is changed to the color c by a displacement d. The displacement d is a displacement of the embedded color b from white. Thus, if the color with which information has been embedded is given as a displacement and a region of the color a includes a pixel of the color c, a displacement between the color a and the color c may be compared with the given displacement to determine whether or not the pixel is a pixel in which information has been embedded.

In a white portion, the color with which information has been embedded may be detected without using a color displacement to determine whether or not information has been embedded or to obtain embedded information. In FIG. 2C, a region p represents a region where information has been embedded in a white portion.

The following exemplary embodiments of the present invention are based on the findings described above, and will be described in the context of the use of a color displacement and the use of a color. Regardless of whether a color displacement is used or a color is used, various color variations may occur in a given image. Any image may be used as a given image. If an image having information embedded therein, such as the image illustrated in FIG. 2C, is given, it is detected that the image has information embedded therein, or a process for acquiring the embedded information is performed.

Figure 1:
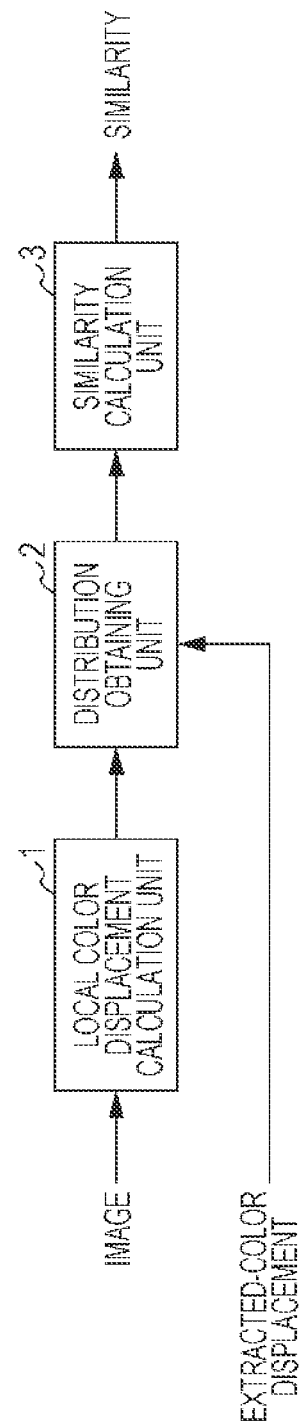
FIG. 1 is a configuration diagram illustrating a first exemplary embodiment of the present invention.

FIG. 1 is a configuration diagram illustrating a first exemplary embodiment of the present invention. In the first exemplary embodiment, a color displacement is used.

A local color displacement calculation unit 1 calculates local color displacements. The local color displacements are color displacements locally occurring in individual regions of interest of a given image. Each of the individual regions of interest includes one or plural pixels. The local color displacements are calculated while changing regions of interest over the whole or part of the given image. The local color displacements may be obtained by, for example, calculating color displacements in the regions of interest from a local average color. The local average color may be obtained by calculating an average of colors of all or some pixels in regions (local regions) with a predetermined size and shape including the regions of interest. Further, color displacements may be determined as color difference vectors. The color difference vectors may be determined using color vectors in the regions of interest in the color space and a color vector of the local average color. Alternatively, a difference for each component representing a color may be determined, and vectors whose elements are the respective differences may be used as color difference vectors. For example, differences between colors of the regions of interest and the local average color may be determined for individual color components, and used as the values of the individual color components of the color difference vectors. Alternatively, local derivative values may be determined from color values of the image, or local derivative values may be determined for individual color components, and the local color displacements may be determined using such derivative values.

A distribution obtaining unit 2 sets a reference region with respect to the regions of interest, and obtains the distribution of local color displacements with respect to an extracted-color displacement that is a displacement in a color preset in the reference region. The local color displacements may be obtained in various directions and with various sizes, and the distribution of local color displacements whose differences from the extracted-color displacement are within a predetermined range may be obtained. The spreading from the extracted-color displacement may be obtained as a distribution. For example, the spreading in directions different from the vector direction of the extracted-color displacement, such as the variance, standard deviation, maximum distance, or average distance, may be obtained as a distribution. In this example, the extracted-color displacement may be implemented using a vector of a color with which given information has been embedded or using a vector determined from a local derivative value of this color.

The reference region used to obtain a distribution may be a region having a predetermined size including the regions of interest or may be a region set in accordance with angles defined between the vectors of the local color displacements in the regions of interest and the vector of the extracted-color displacement or in accordance with the lengths of the vectors of the local color displacements or the like. Alternatively, the reference region may be a connection region where regions of interest corresponding to local color displacements for which angles defined between the vectors of the local color displacements and the vector of the extracted-color displacement are within a predetermined range or both the angles and the lengths of the vectors of the local color displacements are within a predetermined range are connected to each other on an image surface.

A similarity calculation unit 3 calculates similarity to the extracted-color displacement for the regions of interest from the distribution obtained by the distribution obtaining unit 2. For example, if the distribution of local color displacements is spread out by a large amount from the extracted-color displacement, color mixture may be more likely to occur than a distribution spread out by a small amount, due to various factors, for example, external influences such as dust and paper powder, roughness of the image surface, etc., and similarity is reduced compared to that in an ideal state where such factors are not present. Conversely, if the distribution is spread out by a small amount, it may be assumed that the local color displacements represent the extracted-color displacement, and similarity is increased compared to that in a case where the distribution is spread out by a large amount. The relationship between a distribution t and a similarity Fy may be defined by, for example, a predetermined function S(t). In addition, for example, the function S(t) may be controlled in accordance with the length of the vector of the extracted-color displacement, and, for instance, the function S(t) may be controlled so that the larger the length of the vector of the extracted-color displacement is, the larger the value of the function S(t) for the spreading of the distribution is, thereby increasing similarity. The value of the function S(t) may be altered by other various factors. When similarity is calculated from the distribution, the case where the vector of the extracted-color displacement and the vectors of the local color displacements are oriented in opposite directions may be taken into account so that similarity levels in the forward and opposite directions are determined and the larger one of them is selected to deal with the case where information is embedded with inversion (or subtraction) when embedded.

Figure 4:
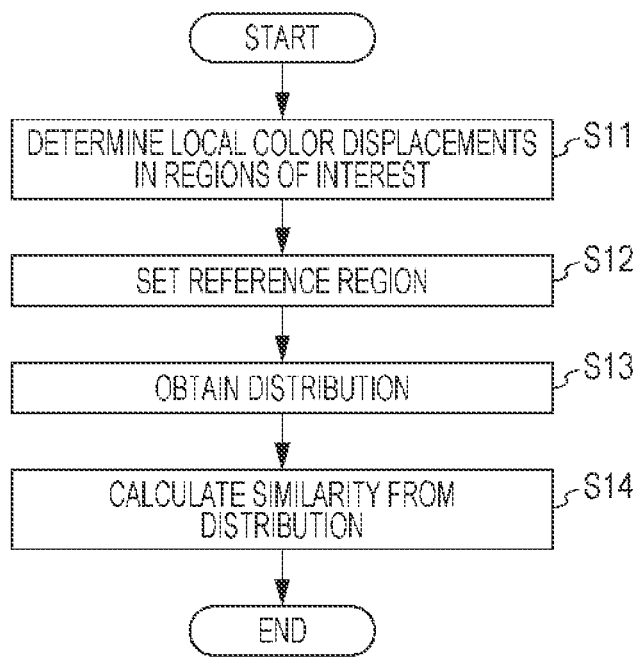
FIG. 4 is a flowchart illustrating an example of an operation according to the first exemplary embodiment of the present invention.
Figure 5A:
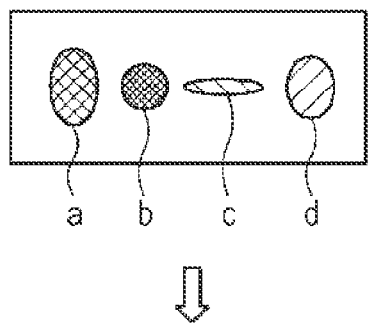
FIGS. 5A to 5C illustrate a specific example of the operation according to the first exemplary embodiment of the present invention.
Figure 5B:
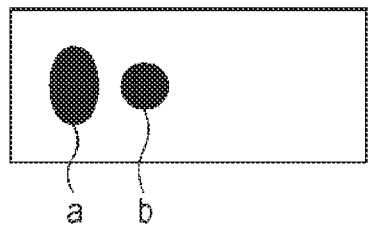
Figure 5C:
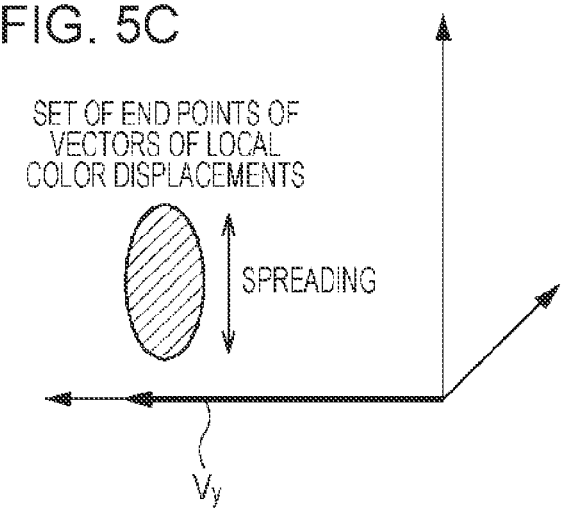

FIG. 4 is a flowchart illustrating an example of an operation according to the first exemplary embodiment of the present invention, and FIGS. 5A to 5C illustrate a specific example of the operation according to the first exemplary embodiment of the present invention. Referring to FIG. 4, in S11, the local color displacement calculation unit 1 determines local color displacements in individual regions of interest from color difference vectors between a local average value and colors in the regions of interest, local derivative values, or the like.

Then, the distribution obtaining unit 2 obtains the distribution of local color displacements based on the local color displacements for the individual regions of interest calculated by the local color displacement calculation unit 1. By way of example, a reference region is set from angles defined between vectors of the local color displacements and the vector of the extracted-color displacement or from the angles and the lengths of the vectors of the local color displacements, and the spreading from the extracted-color displacement is obtained in the reference region. FIGS. 5A to 5C illustrate a specific example of this case, and the following description will be made with reference to FIG. 4 as well as FIGS. 5A to 5C.

In S12, local color displacements for which angles defined between the vectors of the local color displacements calculated in S11 and the vector of the extracted-color displacement are within a predetermined range or both the angles and the lengths of the vectors of the local color displacements are within a predetermined range are extracted. FIG. 5A illustrates a local color displacement image obtained by determining local color displacements for a certain image. In the illustrated example, different local color displacements are represented by different hatching patterns. A region b represents a region where information has been embedded, and regions c and d have different directions or lengths of vectors of local color displacements from those of the region b. A local color displacement for a region a is a local color displacement for which an angle defined between the vector of the local color displacement and the vector of the extracted-color displacement is within a predetermined range or both the angle and the length of the vector of the local color displacement are within a predetermined range. It is determined for each of the local color displacements whether or not the corresponding angle or both the corresponding angle and the length of the corresponding vector are within a predetermined range, and a local color displacement within the range is represented in black while a local color displacement outside the range is represented in white, as illustrated in FIG. 5B. In effect, binarization is implemented through the determination. A connection region where regions of interest corresponding to local color displacements within the range are connected to each other on an image surface is used as a reference region. In the binary image illustrated in FIG. 5B, connection regions represented in black, here, the regions a and b, may be used as reference regions.

In S13, spreading of local color displacements in the reference region from the extracted-color displacement is obtained as a distribution. FIG. 5C illustrates the vector $V_y$ of the extracted-color displacement and an example of a region for vectors of local color displacements, where the end points of the vectors of the local color displacements originating at the origin are spread out. For this region, spreading in a direction away from the vector of the extracted-color displacement is obtained as a distribution. For example, in the region b, since information has been embedded in the region b, color displacements tend to collectively appear. In the region a, on the other hand, color displacements vary because no specific color is used. Therefore, the distribution for the region a is spread out by a larger amount than the distribution for the region b. In this manner, the distribution obtained by the distribution obtaining unit 2 represents the probability of being a region having information embedded therein.

A distribution may be obtained using a method other than that described above. When a different method is used, a process corresponding to the method to be used may be performed to obtain a distribution.

In S14, the similarity calculation unit 3 calculates similarity to the extracted-color displacement for the regions of interest using the distribution obtained by the distribution obtaining unit 2. If the regions of interest are included in any of the reference regions represented in black in FIG. 5B, similarity is calculated using the distribution obtained from the reference region. As described above, a lower similarity is set when the spreading illustrated in FIG. 5C as a distribution is larger, whereas, a higher similarity is set when the spreading is smaller. If the regions of interest are not included in any reference region, it has been determined that the angles defined between the vectors of the local color displacements and the vector of the extracted-color displacement or both the angles and the lengths of the vectors of the local color displacements are outside the predetermined range when the reference region was determined. It may therefore be determined that no information has been embedded in the regions of interest. Thus, similarity may not necessarily be calculated or may be set to a constant such as 0.

For example, the similarity calculated by the similarity calculation unit 3 for the individual regions of interest may be compared with a preset threshold, and it may be determined that the given image has information embedded therein if any of the regions of interest exhibits a similarity greater than or equal to the threshold. Alternatively, a similarity image in which levels of similarity are assigned to the individual regions of interest may be generated. In the similarity image, a higher level is assigned to a region where information has been embedded and, for example, as in the image illustrated in FIG. 2B, the image of the embedded information is reproduced. Once the position or shape of a portion of the image where a locally maximum value is obtained is specified, the position at which the information has been embedded may be determined, leading to the obtainment of the information.

Once the presence or absence of information is determined and the information is obtained in this manner using similarity, information embedded in a portion other than a white margin may also be detected and obtained. Furthermore, even if variations in color have occurred due to various factors, information may be reliably detected and obtained using the levels of similarity.

FIG. 6 is a configuration diagram illustrating a first exemplary modification of the first exemplary embodiment of the present invention. In the first exemplary modification, by way of example, similarity is determined not only using the distribution obtained by the distribution obtaining unit 2 but also using the relationships between the extracted-color displacement and the local color displacements.

In the first exemplary modification of the first exemplary embodiment, the similarity calculation unit 3 determines similarity obtained from the distribution by the distribution obtaining unit 2 and similarity between the local color displacements in the regions of interest and the extracted-color displacement, and calculates overall similarity from both similarities. Overall similarity may be calculated by, for example, using the following expression, assuming that the overall similarity for a certain region of interest is represented by F, the vector of the extracted-color displacement is represented by $V_y$, the vector of a local color displacement is represented by V, and the angle defined between the vector $V_y$ and the vector V is represented by $\alpha$, a distribution is represented by t, and the function used to determine similarity from the distribution t is represented by S(t), $$F=|V|^m(\cos(\alpha))^n \cdot S(t),$$

where m and n are constants.

In the expression for the overall similarity F, if the function S(t) is fixed, the smaller the angle defined between the vectors $V_y$ and V, the higher the overall similarity F. Theoretically, if information has been embedded, the local color displacement will be the extracted-color displacement. Thus, the higher the overall similarity F, the more probable it is that information may be embedded in the region of interest. Further, the function S(t) has a larger value than that when the distribution t is spread out by a larger amount as the spreading of the local color displacement decreases, and it is assumed that the local color displacement in the reference region is a color displacement due to the embedding of information. Thus, the overall similarity F is also high. While in the expression given above, multiplication by the function S(t) is involved, the addition or subtraction of the function S(t) may be involved. Furthermore, the similarity to be calculated from a local color displacement and the extracted-color displacement is not limited to that obtained from the expression given above, and may be determined using any other method. Moreover, also in the first exemplary modification, similarity levels in opposite directions may be determined for the vector of the extracted-color displacement and the vector of a local color displacement, and may be selectively used.

In an operation according to the first exemplary modification of the first exemplary embodiment of the present invention, by way of example, when similarity is calculated in S14 in the flowchart illustrated in FIG. 4, overall similarity may be calculated using the similarity calculated from the distribution and the similarity calculated from the local color displacements and the extracted-color displacement. For example, in FIG. 4, after local color displacements are determined in S11, a reference region is set in S12 and a distribution is obtained in S13. Then, in S14, the similarity calculation unit 3 determines similarity to the extracted-color displacement for the regions of interest using the distribution obtained in S13, and also determines similarity between the local color displacements in the regions of interest and the extracted-color displacement. Thus, the similarity calculation unit 3 calculates overall similarity from both similarities.

Figure 7:
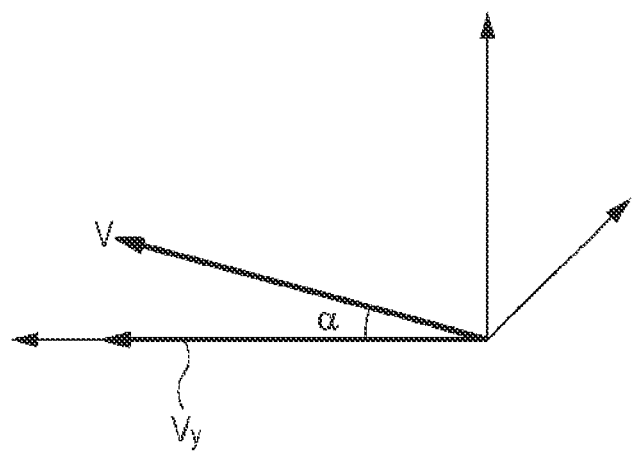
FIG. 7 illustrates an example of a vector of a local color displacement and a vector of an extracted-color displacement.

FIG. 7 illustrates an example of a vector of a local color displacement and a vector of an extracted-color displacement. In the illustration of FIG. 7, a vector V of a local color displacement and a vector $V_y$ of an extracted-color displacement originate at the origin. When the expression for determining the overall similarity F described above is used, the angle defined between the vector V of the local color displacement and the vector $V_y$ of the extracted-color displacement is represented by α. The larger the angle α, the lower the overall similarity F. In addition, the larger the spreading illustrated in FIG. 5C as the distribution, the lower the overall similarity F, whereas, the smaller the spreading, the higher the overall similarity F.

Also when the similarity calculation unit 3 calculates overall similarity, for example, the similarity calculated for individual regions of interest may be compared with a preset threshold, and it may be determined that the given image has information embedded therein if any of the regions of interest exhibits a similarity greater than or equal to the threshold. Alternatively, a similarity image in which levels of overall similarity are assigned to the individual regions of interest may be generated. Once the position or shape of a portion of the image where a locally maximum value is obtained is specified, the position at which the information has been embedded may be determined, leading to the obtainment of the information.

In a case where the presence or absence of information is determined and the information is obtained in this manner using overall similarity, not only the distribution of local color displacements but also the relationships between the local color displacements and the extracted-color displacement are used. Thus, the embedding of information in the regions of interest may be more reliably determined than when similarity is calculated using a distribution.

Figure 8:
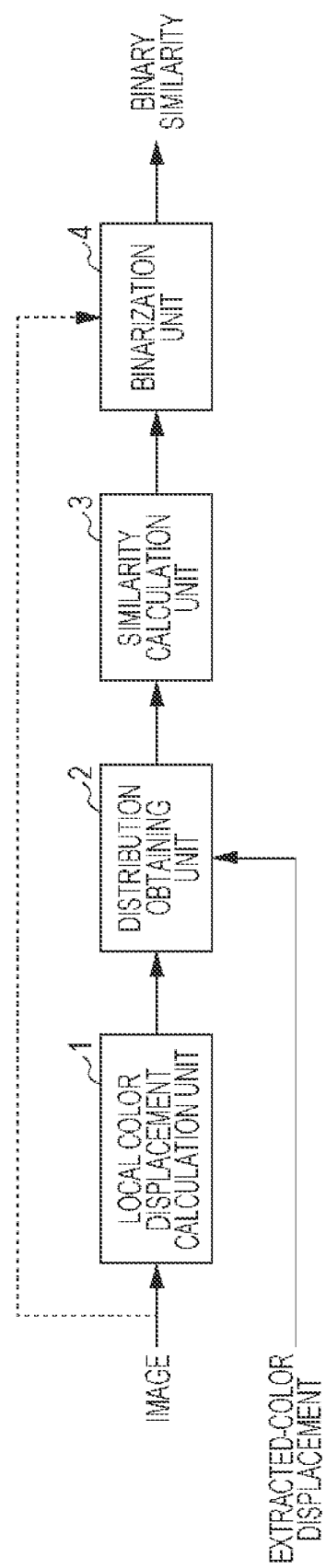
FIG. 8 is a configuration diagram illustrating a second exemplary modification of the first exemplary embodiment of the present invention.

FIG. 8 is a configuration diagram illustrating a second exemplary modification of the first exemplary embodiment of the present invention. In the second exemplary modification, a binarization unit 4 is provided in addition to the configuration illustrated in the configuration illustrated in FIG. 1.

The binarization unit 4 binarizes the regions of interest on the basis of the similarity calculated by the similarity calculation unit 3. The binarization unit 4 may binarize the regions of interest by comparing the similarity calculated by the similarity calculation unit 3 with a preset threshold. A region exhibiting a similarity greater than or equal to the threshold may be developed in a binary image. Alternatively, the binarization unit 4 may perform enhancement processing on the given image in accordance with similarity, and may binarize the image subjected to the enhancement processing. For example, the higher the similarity, the greater the effect the enhancement processing has. Thus, a region having information embedded therein may be enhanced, and the enhanced portion is developed in a binary image through binarization. Any of well-known methods for enhancement processing may be used, and, for example, similarity may be added to or multiplied by the component of a given color to be extracted.

As described above, the embedding of information may be determined using a similarity image generated based on the similarity output from the similarity calculation unit 3. With the use of a binary image, moreover, a region having information embedded therein may be explicitly identified.

In the configuration illustrated in FIG. 8, by way of example, the binarization unit 4 is added to the configuration illustrated in FIG. 1. The binarization unit 4 may also be added to the configuration according to the first exemplary modification illustrated in FIG. 6. In this case, the binarization unit 4 binarizes the regions of interest on the basis of the overall similarity calculated by the similarity calculation unit 3.

Figure 9:
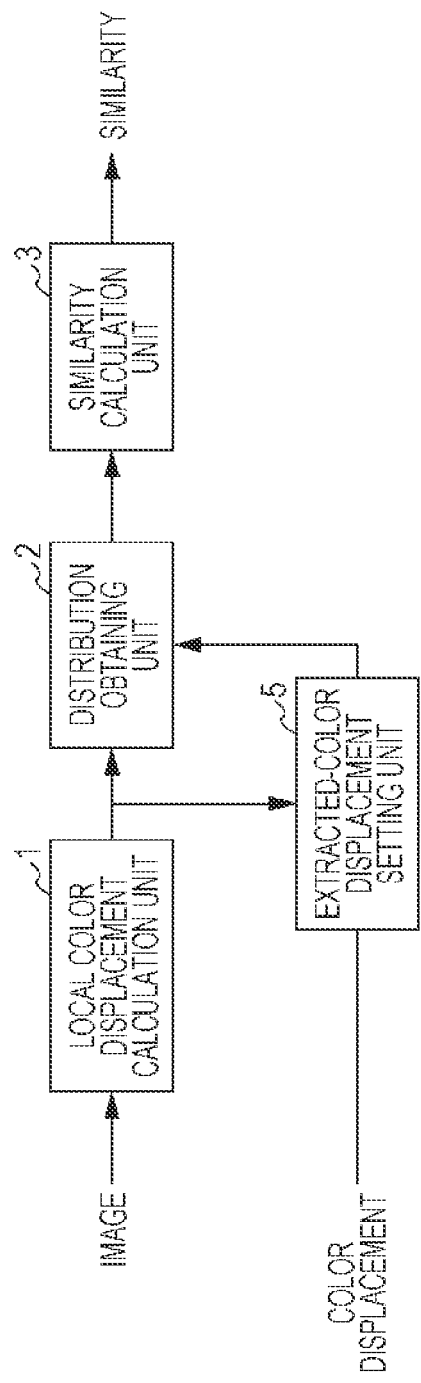
FIG. 9 is a configuration diagram illustrating a third exemplary modification of the first exemplary embodiment of the present invention.

FIG. 9 is a configuration diagram illustrating a third exemplary modification of the first exemplary embodiment of the present invention. In the third exemplary modification, a vector of a color with which given information has been embedded or a vector determined from a local derivative value of this color is corrected, and the corrected vector is used as an extracted-color displacement.

An extracted-color displacement setting unit 5 sets an extracted-color displacement from the directions of local color displacements obtained from individual regions of interest and from the direction of a displacement of a given color to be extracted. For example, local color displacements whose displacement directions are within a predetermined angular range with respect to the displacement of the given color may be selected from among the local color displacements obtained from the individual regions of interest, and an average value, a center value, a local maximum value, or the like may be determined as an estimated color displacement. An extracted-color displacement may be set based on the estimated color displacement. The estimated color displacement may be directly set as an extracted-color displacement, or the direction of the displacement of the given color may be corrected to the direction of the estimated color displacement while the length of the vector is not corrected, and the color displacement obtained after correction may be set as an extracted-color displacement.

An extracted-color displacement may also be set by determining a frequency distribution of the directions of the local color displacements obtained from the individual regions of interest and determining a direction indicating one of the local maximum values of frequency in the frequency distribution which is the closest to the direction of the displacement of the given color. The direction of the displacement of the given color may be corrected to the determined direction, and an extracted-color displacement may be set. The setting methods described above are merely illustrative, and an extracted-color displacement may be set using any other method.

The distribution obtaining unit 2 obtains, by using the extracted-color displacement set by the extracted-color displacement setting unit 5, the distribution of local color displacements in a reference region with respect to the extracted-color displacement. Since an extracted-color displacement is set by the extracted-color displacement setting unit 5 in accordance with the given image, even if variations in color have occurred due to various factors, the spreading of the local color displacements from the extracted-color displacement due to the variations in color may be corrected, and the influence of the variations in color on the distribution may be corrected. Therefore, when using the distribution obtained by the distribution obtaining unit 2, the similarity calculation unit 3 may calculate a higher similarity for a region having information embedded therein than when using the displacement of the given color as it is. Thus, the information may be more reliably detected or obtained.

It goes without saying that the extracted-color displacement setting unit 5 described in the third exemplary modification may further be added to the configuration according to the first exemplary modification illustrated in FIG. 6, the configuration according to the second exemplary modification illustrated in FIG. 8, or the configuration in which the binarization unit 4 described in the second exemplary modification is added to the configuration according to the first exemplary modification. In a case where the extracted-color displacement setting unit 5 is added to the configuration according to the first exemplary modification or the configuration in which the binarization unit 4 is added to the configuration according to the first exemplary modification, the similarity calculation unit 3 may calculate similarity between the local color displacements and the extracted-color displacement by using the extracted-color displacement obtained by setting the displacement of the given color using the extracted-color displacement setting unit 5, and further calculate similarity from a distribution to calculate overall similarity.

Figure 10:
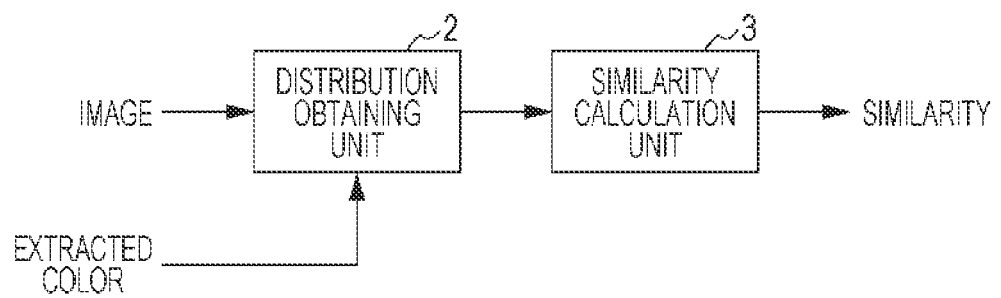
FIG. 10 is a configuration diagram illustrating a second exemplary embodiment of the present invention.

FIG. 10 is a configuration diagram illustrating a second exemplary embodiment of the present invention. In the first exemplary embodiment described above, a color displacement is used. In the second exemplary embodiment, a color itself is used. The following description will be given of a different point from the first exemplary embodiment described above.

A distribution obtaining unit 2 sets a reference region for regions of interest, and obtains the distribution of colors with respect to an extracted color that is a color preset in the reference region. In some cases, an image may have various colors. In such cases, the distribution of colors in the reference region may be obtained for colors whose differences from the extracted color are within a predetermined range, that is, in a partial color space defined by the extracted color. The spreading of colors from the extracted color may be obtained as a distribution. For example, the spreading in directions different from the vector direction of the extracted color, such as the variance, standard deviation, maximum distance, or average distance, may be obtained as a distribution.

The reference region used to obtain a distribution may be a region having a predetermined size including the regions of interest or may be a region set in accordance with angles defined between the vectors of the colors in the regions of interest and the vector of the extracted color or in accordance with the lengths of the vectors of the colors in the regions of interest or the like. Alternatively, the reference region may be a connection region where regions of interest for which angles defined between the vectors of the colors in the regions of interest and the vector of the extracted color are within a predetermined range or both the angles and the lengths of the vectors of the colors in the regions of interest are within a predetermined range are connected to each other on an image surface.

The partial color space defined by the extracted color may be a range that is a predetermined distance from the extracted color in the color space, or may be set using any of various methods. For example, the partial color space defined by the extracted color may a predetermined color region including a line segment connecting a fixed color such as white and the extracted color.

A similarity calculation unit 3 calculates similarity to the extracted color for the regions of interest from the distribution obtained by the distribution obtaining unit 2. For example, if the distribution of colors in the reference region obtained by the distribution obtaining unit 2 is spread out by a large amount from the extracted color, color mixture may be more likely to occur than a distribution spread out by a small amount, due to various factors, for example, external influences such as dust and paper powder, roughness of the image surface, etc., and similarity is reduced compared to that in an ideal state where such factors are not present. Conversely, if the distribution is spread out by a small amount, it may be assumed that the colors in the reference region represent the extracted color, and similarity is increased compared to those in a case where the distribution is spread out by a large amount. The relationship between a distribution t and a similarity Fy may be defined by, for example, a predetermined function S(t). In addition, for example, the function S(t) may be controlled in accordance with the length of the vector of the extracted color, and, for instance, the function S(t) may be controlled so that the larger the length of the vector of the extracted color is, the larger the value of the function S(t) for the spreading of the distribution is, in order to increase similarity. The value of the function S(t) may be altered by other various factors.

Figure 11:
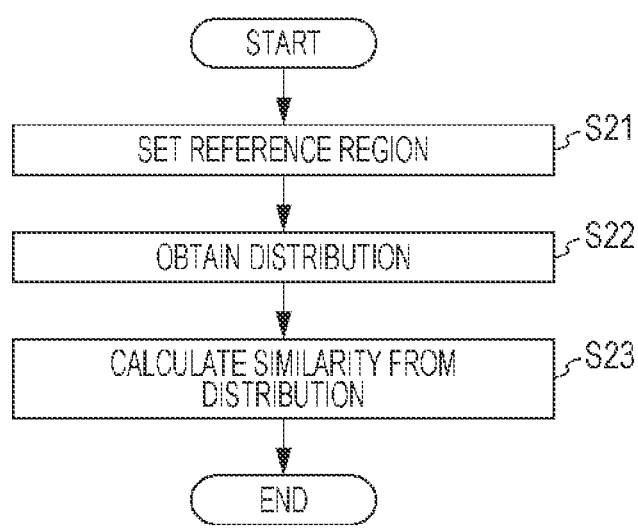
FIG. 11 is a flowchart illustrating an example of an operation according to the second exemplary embodiment of the present invention.

FIG. 11 is a flowchart illustrating an example of an operation according to the second exemplary embodiment of the present invention. Here, when obtaining a distribution, the distribution obtaining unit 2 sets a reference region by, for example, setting a reference region using angles defined between vectors of colors in individual regions of interest and a vector of an extracted color or using the angles and the lengths of the vectors of the colors. When a reference region is set using a different method, a process corresponding to the method to be used may be performed in S21.

In S21, the distribution obtaining unit 2 extracts regions of interest for which angles defined between vectors of colors in regions of interest and a vector of an extracted color are within a predetermined range or both the angles and the lengths of the vectors of the colors are within a predetermined range, and uses, as a reference region, a connection region where such regions of interest are connected to each other on an image surface. The basic process has been described in the first exemplary embodiment with reference to FIGS. 5A to 5C. The image to be processed illustrated in FIG. 5A is a given image or its partial image in the second exemplary embodiment.

In S22, spreading of colors in the reference region from the extracted color is obtained as a distribution. For example, in a region having information embedded therein with the extracted color, the colors used therein tend to be collectively located near the extracted color. In contrast, in a region where colors similar to the extracted color occur due to dust, dirt, and other various factors, the spreading tends to be larger than that in the region having information embedded therein. In this manner, the obtained distribution represents the probability of being a region having information embedded therein.

In S23, the similarity calculation unit 3 calculates similarity to the extracted color for the regions of interest using the distribution obtained by the distribution obtaining unit 2. As described above, a lower similarity is set when the spreading as a distribution is larger in directions different from that of the vector of the extracted color, whereas a higher similarity is set when the spreading is smaller. If the regions of interest are not included in any reference region and when no distribution has been obtained for the regions of interest, it has been determined that the angles defined between the vectors of the colors in the individual regions of interest and the vector of the extracted color or both the angles and the lengths of the vectors of the colors are outside the predetermined range when the reference region was determined. It may therefore be determined that no information has been embedded in the regions of interest. Thus, similarity may not necessarily be calculated or may be set to a constant such as 0.

For example, the similarity calculated by the similarity calculation unit 3 for the regions of interest may be compared with a preset threshold, and it may be determined that the given image has information embedded therein if any of the regions of interest exhibits a similarity greater than or equal to the threshold. Alternatively, a similarity image in which levels of similarity are assigned to the individual regions of interest may be generated. In the similarity image, a higher level is assigned to a region where information has been embedded, and the image of the embedded information is reproduced. Once the position or shape of a portion of the image where a locally maximum value is obtained is specified, the position at which the information has been embedded may be determined, leading to the obtainment of the information.

Once the presence or absence of information is determined and the information is obtained in this manner using similarity, information embedded in a background portion such as a white margin may also be detected and obtained. In this case, even if variations in color have occurred due to various factors, information may be reliably detected and obtained using the levels of similarity.

Figure 12:
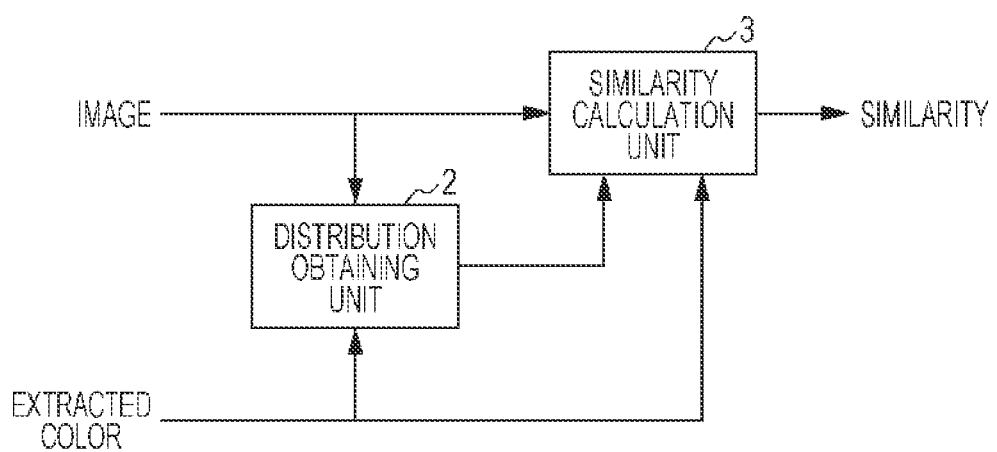
FIG. 12 is a configuration diagram illustrating a first exemplary modification of the second exemplary embodiment of the present invention.

FIG. 12 is a configuration diagram illustrating a first exemplary modification of the second exemplary embodiment of the present invention. In the first exemplary modification, by way of example, similarity is determined not only using the distribution obtained by the distribution obtaining unit 2 but also using the relationships between the extracted color and the colors in the individual regions of interest.

In the first exemplary modification of the second exemplary embodiment, the similarity calculation unit 3 determines similarity obtained from the distribution obtained from the distribution obtaining unit 2 and similarity between the colors in the individual regions of interest and the extracted color, and calculates overall similarity from both similarities. Overall similarity may be calculated by, for example, using the expression given above in the first exemplary modification of the first exemplary embodiment described above, except that the vector of a color displacement is replaced by the vector of a color. That is, the overall similarity F for a certain region of interest may be determined, using the vector $V_y$ of the extracted color, the vector V of a color in a region of interest, the angle α defined between the vector $V_y$ and the vector V, the distribution t, and the function S(t) used to determine similarity from the distribution t, in accordance with $$F=|V|^m(\cos(\alpha))^n \cdot S(t),$$

where m and n are constants.

In the expression for the overall similarity F, if the function S(t) is fixed, the smaller the angle defined between the vectors $V_y$ and V, the higher the overall similarity F. Theoretically, if information has been embedded, the color in the region of interest will be the extracted color. Thus, the higher the overall similarity F, the more probable it is that information may be embedded in the region of interest. Further, the function S(t) has a larger value than that when the distribution t is spread out by a larger amount as the spreading of the color in the reference region decreases, and it is assumed that the color in the reference region is a color due to the embedding of information. Thus, the overall similarity F is also high. While in the expression given above, multiplication by the function S(t) is involved, the addition or subtraction of the function S(t) may be involved. Furthermore, the similarity to be calculated from a color in a region of interest and the extracted color is not limited to that obtained from the expression given above, and may be determined using any other method.

In an operation according to the first exemplary modification of the second exemplary embodiment of the present invention, by way of example, when similarity is calculated in S23 in the flowchart illustrated in FIG. 11, overall similarity may be calculated using the similarity calculated from the distribution and the similarity calculated from the colors in the regions of interest and the extracted color. For example, in FIG. 11, a reference region is set in S21, and a distribution is obtained in S22. Then, in S23, the similarity calculation unit 3 determines similarity for the regions of interest using the distribution obtained in S22, and also determines similarity between the colors in the regions of interest and the extracted color. Thus, the similarity calculation unit 3 calculates overall similarity from both similarities.

Also when the similarity calculation unit 3 calculates overall similarity, for example, the similarity calculated for individual regions of interest may be compared with a preset threshold, and it may be determined that the given image has information embedded therein if any of the regions of interest exhibits a similarity greater than or equal to the threshold. Alternatively, a similarity image in which levels of overall similarity are assigned to the individual regions of interest may be generated. Once the position or shape of a portion of the image where a locally maximum value is obtained is specified, the position at which the information has been embedded may be determined, leading to the obtainment of the information.

In a case where the presence or absence of information is determined and the information is obtained in this manner using the overall similarity, not only the distribution of colors in the reference region but also the relationships between the colors in the regions of interest and the extracted color are used. Thus, the embedding of information in the regions of interest may be more reliably determined than when similarity is calculated using a distribution.

Figure 13:
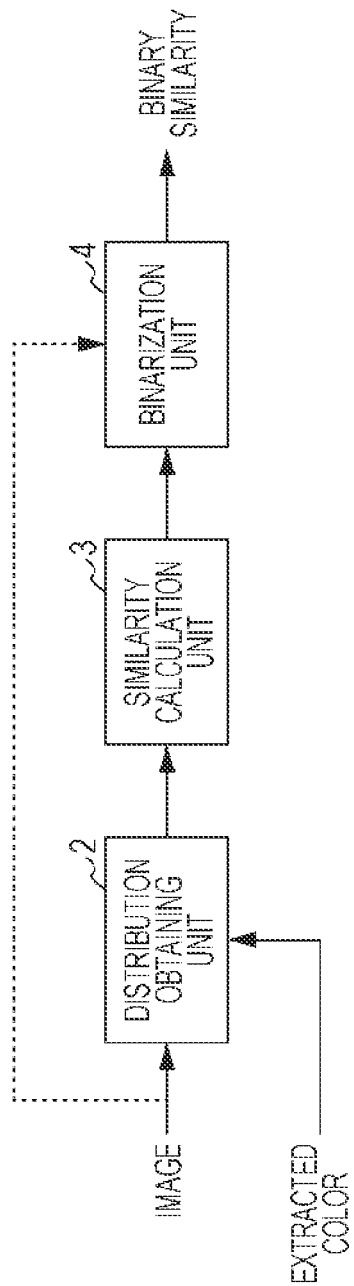
FIG. 13 is a configuration diagram illustrating a second exemplary modification of the second exemplary embodiment of the present invention.

FIG. 13 is a configuration diagram illustrating a second exemplary modification of the second exemplary embodiment of the present invention. In the second exemplary modification of the second exemplary embodiment, a binarization unit 4 is provided in addition to the configuration illustrated in FIG. 10. The binarization unit 4 is substantially the same as the binarization unit 4 described in the second exemplary modification of the first exemplary embodiment, and the binarization unit 4 may be provided in the second exemplary embodiment. The binarization unit 4 has been described previously, and a description thereof is thus omitted here. With the use of a binary image, a region having information embedded therein may be explicitly identified.

In the configuration illustrated in FIG. 13, by way of example, the binarization unit 4 is added to the configuration illustrated in FIG. 10. The binarization unit 4 may also be added to the configuration according to the first exemplary modification of the second exemplary embodiment illustrated in FIG. 12. In this case, the binarization unit 4 binarizes the regions of interest on the basis of the overall similarity calculated by the similarity calculation unit 3.

Figure 14:
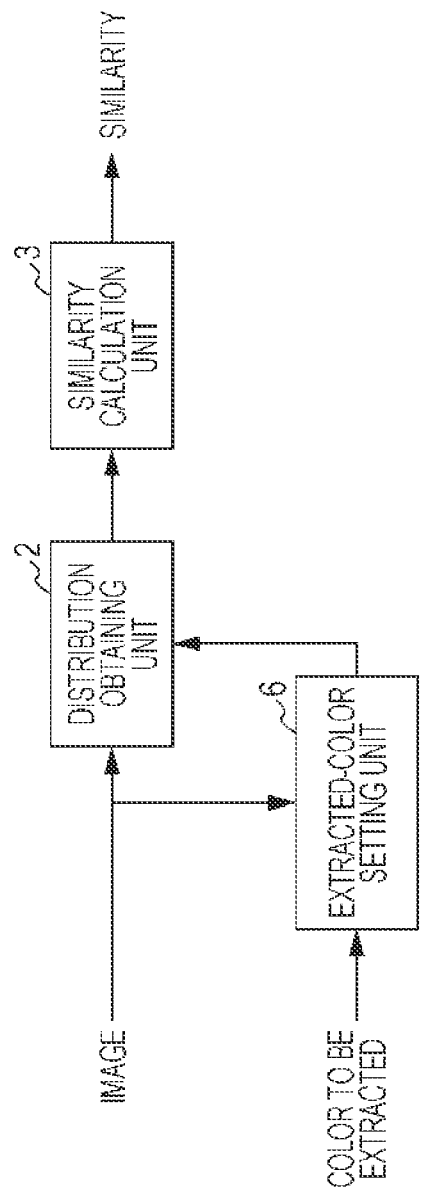
FIG. 14 is a configuration diagram illustrating a third exemplary modification of the second exemplary embodiment of the present invention.

FIG. 14 is a configuration diagram illustrating a third exemplary modification of the second exemplary embodiment of the present invention. In the third exemplary modification of the second exemplary embodiment, by way of example, a color with which given information has been embedded is corrected, and the corrected color is used as an extracted color.

An extracted-color setting unit 6 sets an extracted color from colors in individual regions of interest and a given color to be extracted. For example, colors whose vector directions are within a predetermined angular range with respect to the vector of the given color may be selected from among the colors in the individual regions of interest, and an average value, a center value, a local maximum value, or the like may be determined as an estimated color. An extracted color is set from the estimated color. The estimated color may be directly set as an extracted color, or the direction of the vector of the given color may be corrected to the direction of the vector of the estimated color while the length of the vector is not corrected and the color obtained after correction may be set as an extracted color.

An extracted color may also be set by determining a frequency distribution of the directions of the colors obtained from the individual regions of interest and determining a direction indicating one of the local maximum values of frequency in the frequency distribution which is the closest to the direction of the vector of the given color. The direction of the vector of the given color may be corrected to the determined direction, and an extracted-color displacement may be set. The setting methods described above are merely illustrative, and an extracted color may be set using any other method.

The distribution obtaining unit 2 obtains, by using the extracted color set by the extracted-color setting unit 6, the distribution of colors in a reference region with respect to the extracted color. Since an extracted color is set by the extracted-color setting unit 6 in accordance with the given image, even if variations in color have occurred due to various factors, the spreading of the colors from the extracted color in which the influence of the variations in color is taken into account may be obtained, and the influence of the variations in color on the distribution may be corrected. Therefore, when using the distribution obtained by the distribution obtaining unit 2, the similarity calculation unit 3 may calculate a higher similarity for a region having information embedded therein than when using the given color to be extracted as it is. Thus, the information may be more reliably detected or obtained.

It goes without saying that the extracted-color setting unit 6 described in the third exemplary modification may further be added to the configuration according to the first exemplary modification of the second exemplary embodiment illustrated in FIG. 12, the configuration according to the second exemplary modification of the second exemplary embodiment illustrated in FIG. 13, or the configuration in which the binarization unit 4 described in the second exemplary modification is added to the configuration according to the first exemplary modification. In a case where the extracted-color setting unit 6 is added to the configuration according to the first exemplary modification or the configuration in which the binarization unit 4 is added to the configuration according to the first exemplary modification, the similarity calculation unit 3 may calculate similarity between the colors in the individual regions of interest and the extracted color by using the extracted color set by the extracted-color setting unit 6 as the given color, and further calculate similarity from a distribution to calculate overall similarity.

Figure 15:
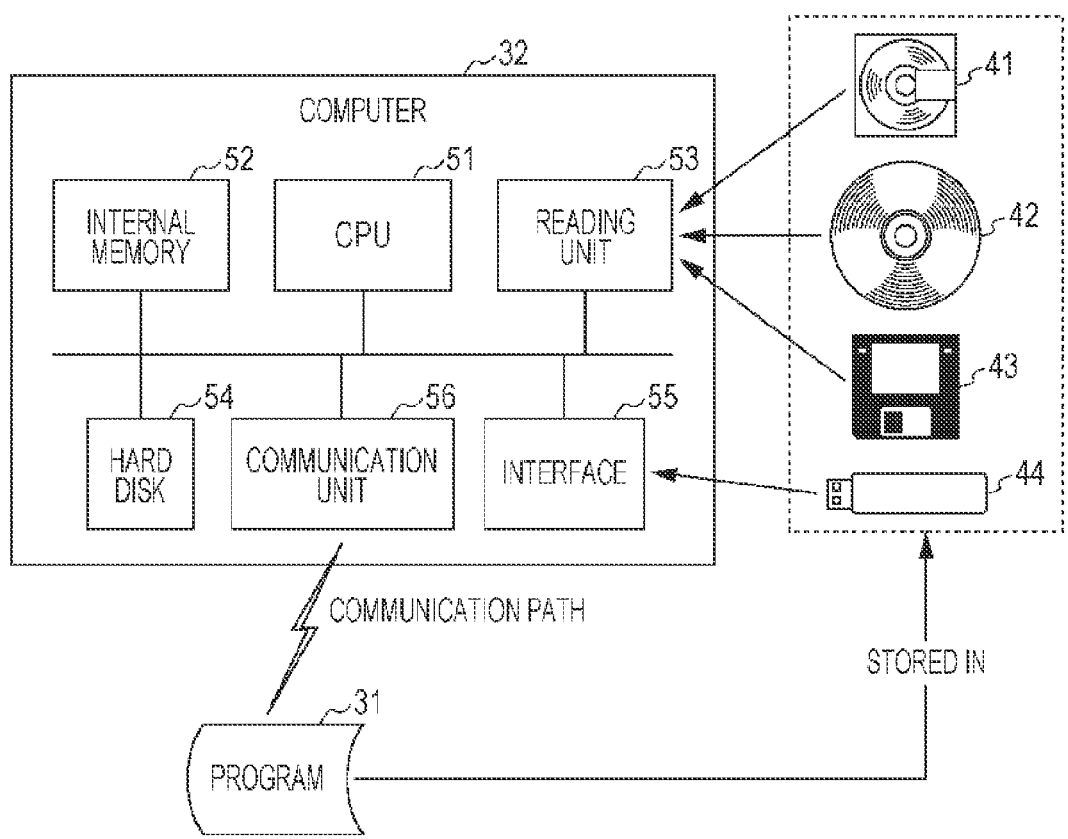
FIG. 15 illustrates an example of a computer program, examples of storage media storing the computer program, and an example of a computer when functions described in the exemplary embodiments of the present invention and the exemplary modifications thereof are implemented by the computer program.

FIG. 15 illustrates an example of a computer program, examples of storage media storing the computer program, and an example of a computer when functions described in the foregoing exemplary embodiments of the present invention and the exemplary modifications thereof are implemented by the computer program.

All or some of the functions of the units described in the foregoing exemplary embodiments of the present invention and the exemplary modifications thereof may be implemented by a computer-executable program 31. In this case, the program 31, data used with the program 31, and the like may be stored in a computer-readable storage medium. The term "storage medium" refers to a medium that causes a reading unit 53 included in a hardware resource of a computer 32 to change its state of energy such as magnetic, optical, or electrical energy in accordance with the description of a program and that transmits the description of the program to the reading unit 53 in the corresponding signal format. Examples of the storage medium may include a magneto-optical disk 41, an optical disk 42 (including a compact disc (CD), a digital versatile disc (DVD), and so forth), a magnetic disk 43, and a memory 44 (including an integrated circuit (IC) card, a memory card, a flash memory, and so forth). The storage medium is not limited to a portable one.

The program 31 is stored in the storage medium described above, and the storage medium is set in, for example, the reading unit 53 or an interface 55 of the computer 32 to read the program 31 by using the computer 32. The read program 31 is stored in an internal memory 52 or a hard disk 54 (including a magnetic disk, a silicon disk, and so forth). A central processing unit (CPU) 51 executes the program 31 to implement all or some of the functions described in the foregoing exemplary embodiments of the present invention and the exemplary modifications thereof. Alternatively, the program 31 may be transferred to the computer 32 via a communication path. The computer 32 may receive the program 31 through a communication unit 56 and store the program 31 in the internal memory 52 or the hard disk 54, and the CPU 51 may execute the program 31 to implement all or some of the functions described above.

A variety of devices may be connected to the computer 32 via the interface 55. For example, an image reading device may be connected via the interface 55, and an image read by the image reading device or an image produced by performing processing on the read image may be used as an image to be processed and may be subjected to the processes described in the foregoing exemplary embodiments of the present invention and the exemplary modifications thereof. Similarity or a similarity image that has been subjected to the processes may be passed to another program, may be stored in the hard disk 54 or a storage medium via the interface 55, or may be transferred to an external device via the communication unit 56. A similarity image may be output from an output device such as a display.

Some of or all the elements may be implemented by hardware. Alternatively, the elements may be implemented together with other elements as a program including all or some of the functions described in the foregoing exemplary embodiments of the present invention and the exemplary modifications thereof. When the elements are used for any other application, the elements may be integrated into a program for the application.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a color displacement calculation unit that calculates local color displacements, the local color displacements being color displacements locally occurring in individual regions of interest of a given image;
    a distribution obtaining unit that obtains a distribution of the local color displacements with respect to an extracted-color displacement, the extracted-color displacement being a displacement of a color preset in a reference region set for the regions of interest; and
    a similarity calculation unit that calculates similarity between the distribution of the local color displacements and the extracted-color displacement for the regions of interest.

2. The image processing apparatus according to claim 1, wherein the similarity calculation unit calculates overall similarity using similarity obtained from the distribution and similarity between the local color displacements in the regions of interest and the extracted-color displacement.

3. The image processing apparatus according to claim 1, wherein the distribution obtaining unit obtains, as the distribution, spreading of the local color displacements in the reference region from the extracted-color displacement.

4. The image processing apparatus according to claim 1, further comprising an extracted-color displacement setting unit that sets the extracted-color displacement from directions of the local color displacements obtained from the regions of interest and a direction of a displacement of a given color.

5. The image processing apparatus according to claim 1, further comprising a binarization unit that binarizes the similarity.

6. The image processing apparatus according to claim 1, further comprising a binarization unit that performs enhancement processing on the given image in accordance with the similarity and that binarizes an image subjected to the enhancement processing.

7. The image processing apparatus according to claim 6, wherein the binarization unit performs enhancement processing on the given image so that the higher the similarity, the greater the effect the enhancement processing has.

8. The image processing apparatus according to claim 6, wherein the binarization unit performs enhancement processing on the given image by adding the similarity to the component of a given color to be extracted.

9. The image processing apparatus according to claim 6, wherein the binarization unit performs enhancement processing on the given image by multiplying the similarity by the component of a given color to be extracted.

10. An image processing apparatus comprising:
    a distribution obtaining unit that obtains a distribution of colors in a given image with respect to an extracted color, the extracted color being a color preset in a reference region set for individual regions of interest in the given image; and
    a similarity calculation unit that calculates similarity between the distribution of colors and the extracted color for the regions of interest.

11. The image processing apparatus according to claim 10, wherein the similarity calculation unit calculates overall similarity using similarity obtained from the distribution and similarity between colors of the regions of interest and the extracted color.

12. The image processing apparatus according to claim 10, wherein the distribution obtaining unit obtains, as the distribution, spreading of the colors of the regions of interest in the reference region from the extracted color.

13. The image processing apparatus according to claim 10, further comprising an extracted-color setting unit that sets the extracted color from the colors of the individual regions of interest and a given color to be extracted.

14. The image processing apparatus according to claim 10, further comprising a binarization unit that binarizes the similarity.

15. The image processing apparatus according to claim 10, further comprising a binarization unit that performs enhancement processing on the given image in accordance with the similarity and that binarizes an image subjected to the enhancement processing.

16. The image processing apparatus according to claim 15, wherein the binarization unit performs enhancement processing on the given image so that the higher the similarity, the greater the effect the enhancement processing has.

17. The image processing apparatus according to claim 15, wherein the binarization unit performs enhancement processing on the given image by adding the similarity to the component of a given color to be extracted.

18. The image processing apparatus according to claim 15, wherein the binarization unit performs enhancement processing on the given image by multiplying the similarity by the component of a given color to be extracted.

19. A non-transitory computer readable medium storing a program causing a computer to execute a process for performing image processing, the process comprising:
    calculating local color displacements, the local color displacements being color displacements locally occurring in individual regions of interest of a given image;
    obtaining a distribution of the local color displacements with respect to an extracted-color displacement, the extracted-color displacement being a displacement of a color preset in a reference region set for the regions of interest; and
    calculating similarity between the distribution of the local color displacements and the extracted-color displacement for the regions of interest.

* * * * *